United States Patent

Low et al.

[15] 3,698,848

[45] Oct. 17, 1972

[54] EXTRUSION CAN

[72] Inventors: George M. Low, Acting Administrator of the National Aeronautics and Space Administration with respect to an invention of; James G. Hunt, 85 Salem End Lane, Framingham Center, Middlesex, Mass. 01701; Roy W. Rice, 5411 Hopark Drive, Alexandria, Fairfax Cty., Va. 22310

[22] Filed: March 29, 1971

[21] Appl. No.: 129,073

[52] U.S. Cl. ............... 425/176, 425/113, 425/133, 72/258
[51] Int. Cl. ............................................. B23b 1/00
[58] Field of Search.......... 425/78, 79, 113, 133, 176; 72/258, 254

[56] References Cited

UNITED STATES PATENTS 3,059,278  10/1962  Daniel ................. 425/176 X
1,989,371  1/1935   Land ................... 425/133 X
3,152,059  10/1964  Wellington ............... 72/258
2,688,400  9/1954   Ansel .................... 72/254

Primary Examiner—H. A. Kilby, Jr.
Attorney—John R. Manning, Monte F. Mott and Wilfred Grifka

[57] ABSTRACT

An extrusion can for use in extruding ceramics under heat and pressure, characterized by a metallic, tubular wall defining a cylindrical body adapted to receive therewithin a ceramic billet to be co-extruded therewith. A particular feature of the extrusion can resides in multiple pairs of adjacent surfaces defining within the tubular wall a plurality of elongated slots extending substantially the length of the body and having deposited therein a filler of a type adapted to preclude welding of the adjacent surfaces as a co-extrusion of the can and billet is achieved.

11 Claims, 5 Drawing Figures

PATENTED OCT 17 1972　3,698,848

JAMES G. HUNT
ROY W. RICE
INVENTORS

Monte F. Mott
Wilfred Griffin
ATTORNEYS

EXTRUSION CAN

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457)

BACKGROUND OF THE INVENTION

1. Field of the Invention:

The invention relates to extrusion cans for ceramic billets and more particularly to preslotted extrusion cans adapted to be co-extruded with the ceramic billets and subsequently removed in a manner which is both economic and practical.

2. Description of the Prior Art:

Ceramic extruding processes have been carried out employing conventional metal extrusion presses. Normally, such processes require a metal extrusion can adapted to be co-extruded with the billet. The can receives therewithin, in a mated relationship, the ceramic billet to be extruded. The thus mated billet and can simultaneously are heated and subsequently placed within a liner of an extrusion press and ultimately are co-extruded.

Use of an extrusion can permits established metal extrusion lubricants, particularly glasses, to be employed during the extrusion process as the can protects the ceramic billet from contamination by the lubricant and effectively insulates the billet from the cooling effect of the die. Once the billet has been co-extruded with the can, the can is removed through a chemical process, where the extruded ceramic is much more resistant to strong acid baths than is the can. However, if the can is of a material which is highly resistant to acid baths or where the ceramic material of the extruded billet possesses relatively little resistance to the acid baths, the can must be removed through the use of mechanical devices. Normally, such removal is achieved by machining two thin slots at opposite sides of a can and then separating adjacent portions of a can and removing the can from about the ceramic extrusion.

In machining the thin slots, numerous difficulties commonly are encountered. For example, it is particularly difficult to provide a continuous slot along opposite sides of the extrusions, particularly where the extrusions are quite lengthy. Where attempts have been made to provide a succession of slots along opposite sides of the co-extruded can, difficulty in maintaining adequate alignment normally is encountered. Furthermore, once extrusion has been achieved, the thickness of the wall has been significantly reduced thus requiring delicate machining operations to be performed. Therefore, a common practice currently employed requires the extrusions to be initially severed into lengths which subsequently are provided with slots extending along the severed lengths. As a result, it heretofore has been deemed impractical to employ extrusion cans in producing relatively long extrusions from ceramic billets.

OBJECTS AND SUMMARY OF THE INVENTION

It therefore is an object of the instant invention to provide an improved extrusion can for use in extruding ceramic billets.

It is another object of the invention to provide an improved extrusion can to be co-extruded with a ceramic billet in providing a relatively long extrusion.

It is another object to provide a readily removable extrusion can for use in co-extruding ceramic billets.

Another object is to provide an improved extrusion can for use in extruding ceramics under elevated heat and pressure, which includes a tubular wall defining a cylindrical body for receiving therewithin a ceramic billet, and having provided therewithin a predetermined arrangement of elongated slots extending the length of the body, whereby selective fracture of the body is accommodated for affording a ready removal of the can from about the co-extruded ceramic extrusion.

These and other objects and advantages are achieved through an improved extrusion can, particularly suited for use in extruding ceramic billets. The can includes a cylindrical, metallic body formed of a multiplicity of elongated sections and is adapted to receive therewithin a ceramic billet to be co-extruded with the can. The sections are delineated by a multiplicity of parallel slots and, where preferred, are supported by a cylindrical shell circumscribing and confining the sections of the body.

DESCRIPTION OF THE PREFERRED EMBODIMENT

Figure 1:
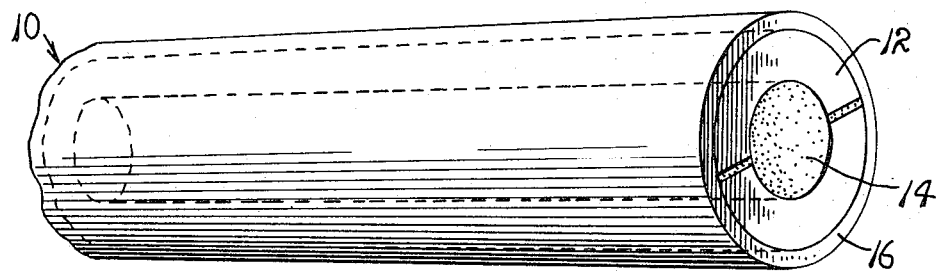
FIG. 1 is a fragmentary, perspective view of an extrusion can constituting an embodiment of the instant invention.

Referring now to the drawing wherein like reference characters designate like or corresponding parts throughout the several views, there is shown in FIG. 1 an extrusion can 10 including therein a cylindrical body 12. The body includes a cylindrical internal surface receiving therewithin a preformed ceramic billet 14 to be co-extruded with the can 10. As illustrated, particularly in FIGS. 1 and 3, the can 10 further includes a cylindrical shell 16 which serves to confine the body 12 of the can 10 about the billet 14.

Figure 2:
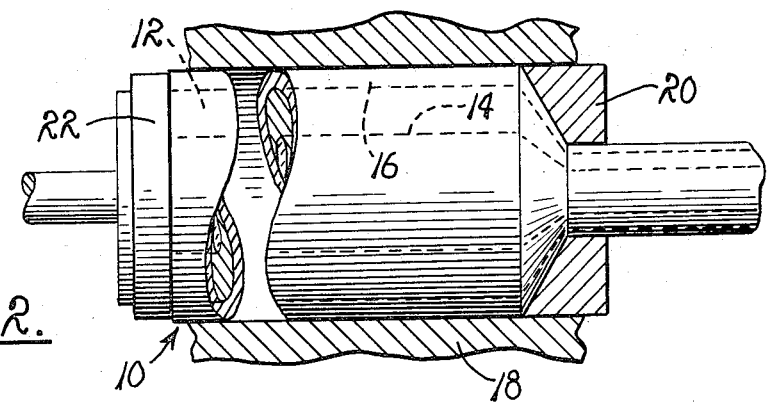
FIG. 2 is a partially sectioned, pictorial view of the can of FIG. 1 as it is co-extruded with an associated ceramic billet.

As illustrated in FIG. 2, the can 10 operatively is seated within a tubular liner 18 of an extrusion press, not shown. In practice, the liner 18 includes an extrusion die 20 through which the can 10 is co-extruded with the billet 14. In order to extrude billet 14, the press further includes a driven ram 22 which is axially advanced through the tubular liner 18 towards the die 20 for simultaneously upsetting the can and the billet.

As a practical matter, the can 10 and the billet 14 simultaneously are heated preparatory to an insertion into the liner 18. However, the manner in which the can and the billet is heated and extruded forms no specific part of the instant invention. Therefore, a detailed description of the extrusion process is omitted in the interest of brevity. It is, however, to be understood that extrusion processes normally are performed utilizing temperatures which frequently range well above 1,000° C. and pressure which is applied in multiple tons. Therefore, it is important that the material of the can 10 and the ceramic material of the billet 14 possess suitably matched extrusion constant. Molybdenum and tungsten base materials generally are found suitable as materials from which the cans can be fabricated for use with refractory ceramics.

Figure 3:
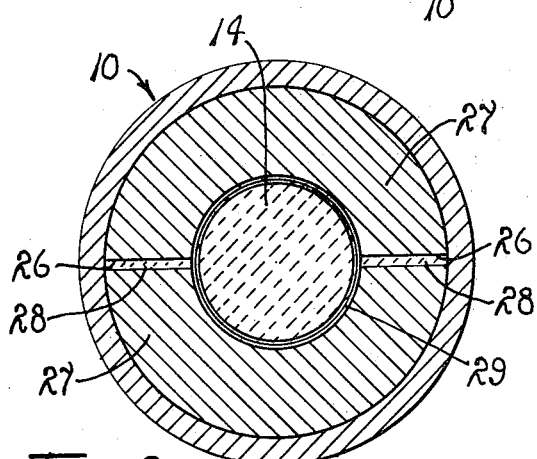
FIG. 3 is a cross-sectional end view, on somewhat of an enlarged scale, of the embodiment shown in FIG. 1.

As best illustrated in FIG. 3, the body 12 conforms to a cylindrical configuration defined by a thickened, tubular wall. The body is provided with a pair of coplanar and diametrically opposed slots 26 extending the full length thereof. The slots 26 divide the body 12 into opposed sections 27 which receive therebetween the billet 14. In practice, the billet 14 is a preformed and densified billet which is coextensive with the length of the body. However, where found practical to do so, the ram 22 can include a penetrating tail plug, not shown, which is projected axially into the can 10 for densifying the ceramic billet as extrusion is initiated.

Since the cans 10 are co-extruded with the billet 14, employing relatively high temperatures and extrusion pressures, it is imperative that the adjacent and opposed surfaces of the sections 27 defining the slots 26 be maintained in a mutually spaced relationship in order to preclude a welding of the surfaces and thus prevent a re-uniting of the sections 27 as extrusion occurs. This is achieved by inserting within the slots 26 a filler material 28, preferably a powder, which is non-bonding with the metal for thus avoiding a welding of the surfaces as heat and pressure are applied. One material which has been found to be particularly useful for this purpose is magnesium oxide in powder form. However, various other materials in various forms can be employed with equal success. Since the filler 28 may, in practice, contaminate the billet 14, it has been found desirable to employ a sheet 29 of a suitable metallic foil for purposes of insulating the billet 14 from the filler material. In such instances, a selected foil 29 is wrapped about the billet 14 in a manner such that access to the billet through the slots 26 is precluded. The material from which the foil is formed is a matter of convenience. However, it should readily be apparent that such material should have a capability of withstanding relatively high temperatures.

The sections 27 of the body 12 are maintained in a cylindrical and mated configuration due to the confining effects of the shell 16. The shell 16 is fabricated from any suitable material, such as the material of the body 12, which can be co-extruded with the body 12. Since the billet 14 is protected by the body 12, the shell 16 can be slit with minimum difficulty, subsequent to a co-extrusion of the billet 14 and the can 10. Thus removal of the sections 27 from about the billet 14 readily is accommodated. However, should it be found practical to do so, the shell 16 can be provided with multiple elongated slots 30, FIG. 5, which establish lines of cleavage for the shell. The slots 30 are filled with a suitable filler material 32 which is of a nature similar to that of the material 28. Hence, subsequent to extrusion, the shell 16 can be fractured along the slots 30 for accommodating a removal of the shell 16 from about the body 12 so as to enhance removal of the body 12 from about the billet 14. In such instances, it is preferred to so position the shell 16 relative to the body 12 so that the slots 30 and 26 of the shell 16 and body 12, respectively, are disposed in orthogonally related planes, FIG. 5.

Figure 4:
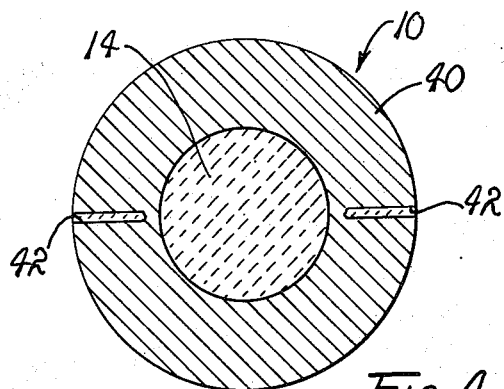
FIG. 4 is a cross-sectional end view of a modified form of the embodiment shown in FIG. 1.
Figure 5:
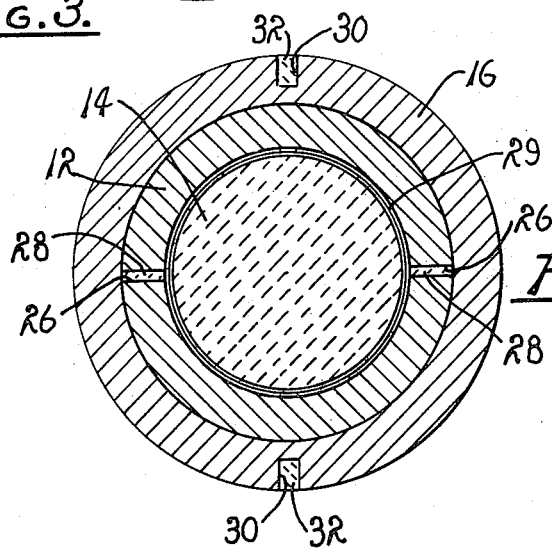
FIG. 5 is a cross-sectional end view of another modified form of the embodiment shown in FIG. 1.

While the form of the extrusion can 10 illustrated in FIGS. 1, 3 and 5 are quite suitable for their intended purposes, under certain circumstances, such as where simplicity in assembly is desired, the can 10 can be fabricated to conform to a configuration similar to that illustrated in FIG. 4. As illustrated in FIG. 4, the can 10 includes a unitary body 40 of a cylindrical configuration. The body 40 also conforms to a cylindrical configuration defined by a thickened tubular wall. The external surface of the body has formed therein a pair of elongated, laterally opposed, coplanar slots 42 filled with a suitable filler 44. In order to prevent the can 10 from fracturing upon exit from the die 20, the slots 42 preferably are of a depth of from two-thirds to three-quarters of the thickness of the wall of the body 40 so that the remaining one-quarter to one-third thickness of the wall can be relied upon to prevent extrusion-induced fracture. However, this thickness is such as to facilitate a ready separation of the wall of the body 40 for accommodating a removal of the co-extruded billet 14. This operation is achieved by prying slots 42 apart causing body 40 to cleave open.

For purposes of mating the billet 14 with a can 10, preparatory to co-extruding the billet and the can, the billet is provided with an outside diameter which substantially equals the internal diameter of the can 10. If desired, particularly where a can having a body 40 of the type illustrated in FIG. 4, is employed, the billet 14 can be pre-sintered or cast within the can's body. Of course, where the can 10 is provided with a body 12, as illustrated in FIGS. 3 and 5, the sections 27 of the body preferably are assembled about the external surface of the billet 14 and subsequently inserted into a confining shell 16. In any event, once a preparatory mating of the billet 14 and the can 10 is accomplished, the mated can and billet are inserted into a liner 18 of a selected press. Normally, the billet 14 and its associated can 10 simultaneously are heated preparatory to insertion in the press. Consequently, the adjacent surface of the liner 18 remains relatively cool. However, due to the combined thickness of the body 12 and the shell 16, where the shell 16 is employed, the surface of the ceramic billet 14 is insulated from high rates of heat transfer and thus rapid cooling of the billet is precluded. As the heated can 10 and billet 14 simultaneously are upset by the ram 22, and thus forced through the die 20, a substantial reduction in the thickness of the body of a can 10 is experienced. Upon completion of the extrusion of the can 10 separation thereof readily is accommodated, without subjecting the external surfaces of the extruded billet to scoring. Such separation is facilitated by the various slots 26 and 42 formed in the body 12 and 40, respectively. Of course, where a slotted shell 16 is provided, separation of the shell is perfected along its slots, employing any suitable machining technique. A similar machining technique can be employed in separating the shell 16 where no slots have been provided, due to the fact that the body 12 serves as a protective layer for protecting the surface of the extruded billet from scoring. Hence, it can readily be appreciated that regardless of the specific form of the can 10, employed in co-extruding a ceramic billet 14, the hereinbefore disclosed extrusion can provides a practical solution to a heretofore perplexing problem of accommodating a separation of a co-extruded extrusion can and its associated ceramic billet.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. An extrusion can for use in extruding ceramic materials comprising:
   A. a metallic tubular wall of a substantially uniform thickness having an internal and an external surface defining a can body of a cylindrical configuration adapted to receive therewithin an elongated ceramic billet;
   B. a pair of mutually spaced, radially extended surfaces defining within said body an elongated slot extending substantially the length thereof; and
   C. a non-metallic filler substantially filling said slot adapted to preclude welding of the opposed surfaces as the can is subjected to heat and pressure.

2. The can of claim 1 further comprising a cylindrical metallic shell concentrically receiving said can body therewithin.

3. The can of claim 2 wherein said radially extended surfaces extend from the external surface to the internal surface of said body.

4. The can of claim 1 wherein said radially extended surfaces extend from the external surface of said body and terminate along substantially parallel lines disposed between the internal and the external surfaces of said wall.

5. The can of claim 3 wherein said shell includes a pair of mutually spaced, radially extended surfaces extending from the external surface into the shell and defining therewithin an elongated slot extending substantially the length thereof, and a non-metallic substance substantially filling the slot.

6. The can of claim 5 wherein said slot of said shell is disposed in a first plane, and said slot defined in said can body is disposed in a second plane angularly related with respect to the first plane.

7. An extrusion can for use in extruding ceramics under heat and pressure comprising:
   A. a metallic wall of a substantially uniform thickness defining a can body having a cylindrical external surface and a cylindrical internal surface adapted to receive therewithin a ceramic billet;
   B. multiple pairs of radially extended surfaces defining within said body a plurality of elongated slots extending substantially the length thereof; and
   C. a non-metallic filler substantially filling said slots for precluding welding of the radially extended surfaces as the can simultaneously is subjected to heat and pressure.

8. The can of claim 7 further comprising a cylindrical shell receiving said body therewithin.

9. The can of claim 8 wherein said radially extended surfaces are disposed in a common plane and are extended from the external surface of said body to the internal surface thereof.

10. The can of claim 7 wherein said radially extended surfaces define within said metallic wall slots having a depth less than the thickness of the wall.

11. The can of claim 9 wherein the shell includes means defining therewithin a pair of coplanar elongated slots disposed in a plane angularly related to said common plane.

* * * * *